US 6,577,633 B1

(12) United States Patent
Kunito et al.

(10) Patent No.: US 6,577,633 B1
(45) Date of Patent: Jun. 10, 2003

(54) ATM COMMUNICATIONS DEVICE

(75) Inventors: Yoshiyuki Kunito, Kanagawa (JP); Takao Terao, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/095,624

(22) Filed: Jun. 10, 1998

(30) Foreign Application Priority Data

Jun. 12, 1997 (JP) .............................................. 9-155477

(51) Int. Cl.[7] .............................................. H04L 12/28
(52) U.S. Cl. ..................... 370/395.3; 370/353; 370/354; 370/489; 370/493
(58) Field of Search .................................. 370/352, 353, 370/354, 389, 395, 396, 397, 398, 400, 401, 402, 409, 489, 490, 493, 395.1, 395.3; 709/238, 244; 710/100, 104, 107

(56) References Cited

U.S. PATENT DOCUMENTS

| 5,511,076 A | * | 4/1996 | Ramakrishnan et al. | .... 370/423 |
| 5,570,355 A | * | 10/1996 | Dail et al. | ................... 370/352 |
| 5,600,650 A | * | 2/1997 | Oskouy | .................... 370/395.6 |
| 5,754,807 A | * | 5/1998 | Lambrecht et al. | .......... 710/128 |
| 5,953,344 A | * | 9/1999 | Dail et al. | ................... 370/443 |
| 5,966,546 A | * | 10/1999 | Thomas et al. | ............. 709/250 |
| 5,982,748 A | * | 11/1999 | Yin et al. | .................... 370/232 |
| 5,987,031 A | * | 11/1999 | Miller et al. | .............. 370/236.1 |
| 6,026,088 A | * | 2/2000 | Rostoker et al. | ........ 370/395.53 |
| 6,041,039 A | * | 3/2000 | Kilkki et al. | ................ 370/230 |
| 6,011,778 A | * | 4/2000 | Kilkki et al. | ................ 370/232 |
| 6,047,326 A | * | 4/2000 | Kilkki | .......................... 709/228 |
| 6,081,505 A | * | 6/2000 | Kilkki | .......................... 370/230 |
| 6,081,843 A | * | 6/2000 | Kilkki et al. | ................ 709/232 |
| 6,115,775 A | * | 9/2000 | Ross et al. | ................... 710/260 |

* cited by examiner

Primary Examiner—Douglas Olms
Assistant Examiner—Bob A. Phunkulh
(74) Attorney, Agent, or Firm—Frommer Lawrence & Haug LLP; William S. Frommer; Dennis M. Smid

(57) ABSTRACT

An ATM communications device connected to an ATM network via an optical fiber improving the efficiency of the traffic in the ATM by separating the real-time data communication system and non real-time data communication system. A CPU bus (or a PCI bus) and a real-time signal bus are connected to an MPEG decoder and an MPEG encoder as real-time data processing devices. The CPU bus is connected to a CPU 18 and a memory 19 as non real-time data processing devices. The ATM communications device includes an optical link, a physical layer device, and an SAR (segmentation and reassembly) devices, carries out processing for communication of real-time data such as a video signal between the ATM network and the real-time signal bus, and carries out processing for communication of non real-time data such as computer information between the ATM network and the CPU bus.

8 Claims, 8 Drawing Sheets

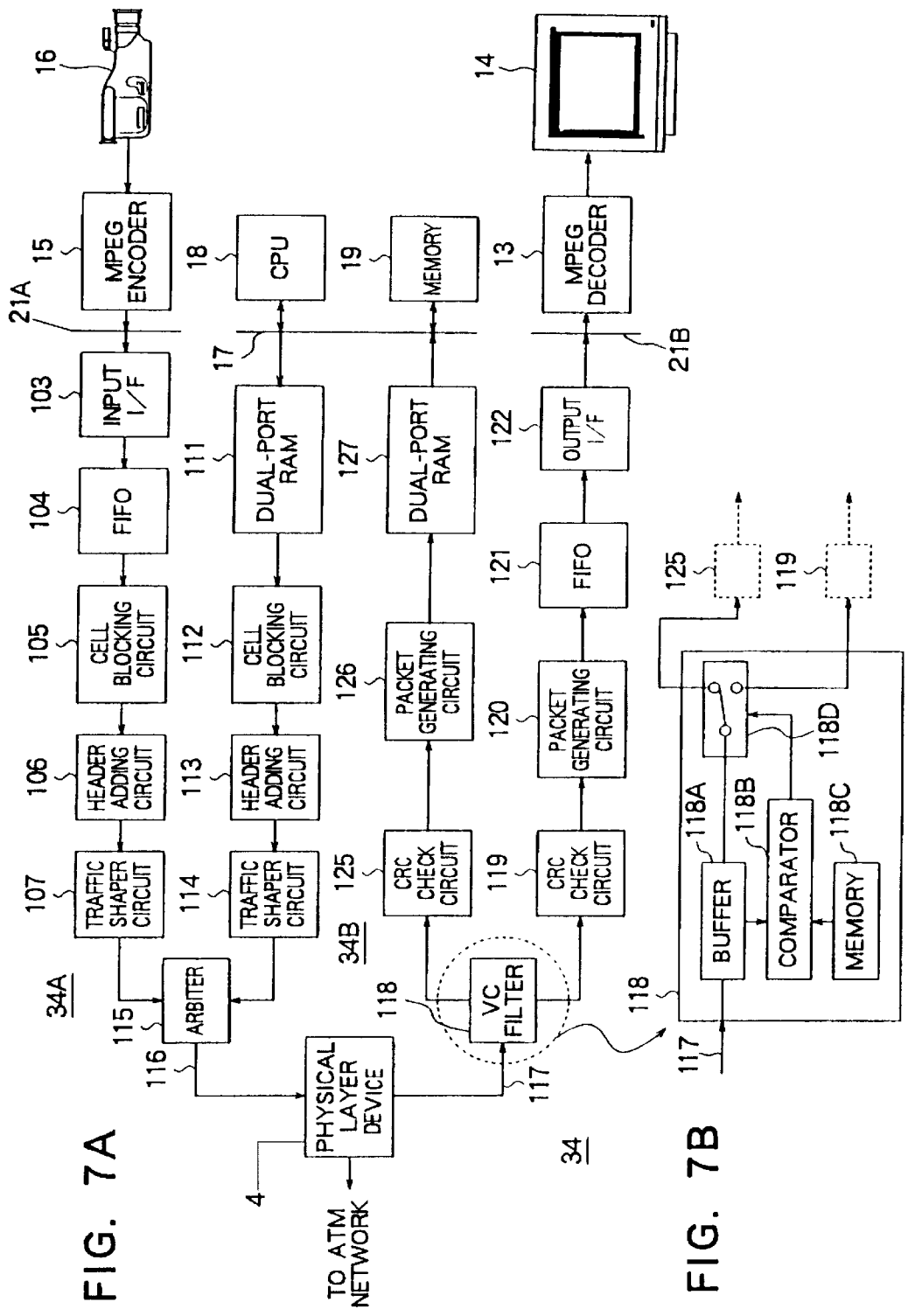

ATM COMMUNICATIONS DEVICE

BACKGROUND OF THE INVENTION

1. Field of the Invention

The present invention relates to a communication system (communication method) using the asynchronous transfer mode (ATM), more particularly relates to a technique for ATM real-time communication which reduces the load on a communication bus and maintains the quality of services requiring which real-time processing.

2. Description of the Related Art

Computer technology and communications technology have been converging leading to the practical use of ATM in communications systems for transmitting a variety of information. Experiments are underway on application of ATM to audio data, video data, computer information, and other multi-media communications.

An ATM communications terminal (communications device) is often constructed using a network interface card (NIC).

FIG. 1 is a block diagram of the configuration of an ATM communications device (NIC) as an example of a general ATM communications device. An ATM communications device is most frequently used connected to a local PCI bus and, for example, has the configuration shown in FIG. 1. Note that this PCI bus is a 32-bit local bus developed by Intel Corporation.

An ATM device 2 shown in FIG. 1 is provided between an optical fiber 1 and a PCI bus 8.

The ATM device 2 comprises, as a transmitting system, a PCI bus interface 7, a segmentation device 5, a physical layer device 4, and an optical link 3 and, as a receiving system, the optical link 3, the physical layer device 4, a reassembly device 6, and the PCI bus interface 7. The optical link 3, the physical layer device 4, and the PCI bus interface 7 are used in both the transmitting system and the receiving system.

The operation of the receiving system in the ATM communications device 2 will be explained next. An ATM cell of an optical signal is transmitted through the optical fiber 1 and received by the optical link 3. In the optical link 3, the received optical signal is converted to an electric signal which is then converted to a cell form in the physical layer device 4. The converted cells are further converted to a packet form so that an upper layer can be used in the reassembly device 6. The packets are output via the PCI bus interface 7 to the PCI bus 8.

The received and converted packets output to the PCI bus 8 are transferred, for example, to a memory 19 or to other devices 13, 15, 18, 19, and 20 as shown in FIG. 2.

FIG. 2 is a block diagram of an ordinary ATM terminal device.

The ATM device 2 is connected via the PCI bus 8 to CPU bus 17. The CPU bus 17 is connected to the above mentioned ATM communications device 2 and to an ATM terminal comprised of an MPEG (Moving Picture Experts Group) decoder 13, an MPEG encoder 15, a CPU 18, a memory 19, and a display 20. The MPEG decoder 13 is connected to a television monitor 14. The MPEG encoder 15 is connected to a video camera 16.

Next, an explanation will be made of the operation of the transmitting system in the ATM communications device 2. When a packet is transmitted from the memory 19 or from other devices connected to the CPU bus 17 as shown in FIG. 2 to the PCI bus 8, it travels through the PCI bus interface 7 in the ATM device 2 and is divided into 53-byte cells at the segmentation device 5. The plurality of cells are then transmitted via the physical layer device 4 to the optical link 3, then to the optical fiber 1.

The strong feature of ATM communications is its ensuring of a real-time property, that is, it being designed to assure the necessary frequency bandwidth. In many cases, however, a real-time property cannot be ensured in the strict sense of the term with a PCI bus 8, given as an example of a local bus, or at an ordinary CPU bus, in ATM used for video signals, computer information, or other multi-media communications.

Generally, information transmitted in real time is small in packet size, for example, 188 bytes in a transport stream of the MPEG2. Therefore, in multimedia communications, for example, when transmitting a large amount of information, which is typical in compressed motion picture information, there are frequent requests for bus occupation rights. Furthermore, when the same bus is used for heavy load, that is, frequent access, large transmission volume devices, for example, in FIG. 2, the memory 19 or other devices 13, 15, 18, and 20, the occupancy ratio of these devices on the bus becomes high and a real-time property cannot be assured in frequent cases.

SUMMARY OF THE INVENTION

An object of the present invention is to provide an ATM terminal (device) connected to an ATM network which can reduce the load on a communication bus in real-time communication by ATM without causing a deterioration in the quality of services requiring a real-time property.

According to a first aspect of the present invention, there is provided an ATM communications device comprising a physical layer processing means, connected to an ATM communication network, for performing processing for converting between first data in the ATM communication network and second data in the ATM communications device; a separating means for separating the converted data into real-time data to be communicated in real time and non real-time data not to be communicated in real time; a real-time data processing means for performing processing for communication of the real-time data and outputting the processed real-time data; and a non real-time data processing means for performing the processing for communication of the non real-time data and outputting the processed non real-time data.

Preferably, the real-time data comprises a first identifier, the non real-time data comprises a second identifier, and the separating means separates the real-time data and the non real-time data by identifying the first identifier and/or the second identifier.

Preferably, the first and second identifiers are permanent virtual channel type identifiers.

Preferably, the first and/or second identifiers are virtual path type identifiers and/or virtual channel type identifiers.

According to a second aspect of the present invention, there is provided an ATM communications device comprising a real-time inputting means for receiving real-time data for real-time communication; a non real-time inputting means for receiving non real-time data for non real-time communication; a real-time data processing means for performing processing for communication of the real-time data and outputting the processed real-time data; a non real-time data processing means for performing processing for communication of the non real-time data and outputting the processed non real-time data; and a selecting means for receiving the processed real-time data and the processed non real-time data and preferentially selecting the real-time data.

According to a third aspect of the present invention, there is provided an ATM communications device comprising a real-time bus means for input and output of real-time data for real time communication; a non real-time bus means for input and output of non real-time data for non real-time communications; a real-time data processing means for performing processing for communication of the real-time data and outputting the processed real-time data; a non real-time data processing means for performing processing for communication of the non real-time data and outputting the processed non real-time data; a selecting means for receiving the processed real-time data and the processed non real-time data and preferentially selecting the input real-time data; a physical layer processing means, connected to an ATM communication network, for performing processing for converting between first data in the ATM communication network and second data in the ATM communications device; a separating means for separating the converted data into real-time data to be communicated in real time and non real-time data not to be communicated in real time; a real-time data processing means for performing processing for communication of the real-time data and outputting the processed real-time data; and a non real-time data processing means for performing processing for communication of the non real-time data and outputting the processed real-time data.

Preferably, the real-time bus means comprises a first real-time bus and a second real-time bus, the first real-time bus receives the real-time data, and the second real-time bus outputs the real-time data.

According to a fourth aspect of the present invention, there is provided a method of ATM communication including the steps of performing processing for converting between first data in an ATM communication network and second data in an ATM communications device; separating the converted data into real-time data to be communicated in real time and non real-time data not to be communicated in real time; performing processing for communication of the real-time data and outputting the processed real-time data; and performing processing for communication of the non real-time data and outputting the processed real-time data.

According to a fifth aspect of the present invention, there is provided a method of ATM communication including the steps of receiving real-time data for real time communication; receiving non real-time data for non real-time communication; performing processing for communication of the real-time data and outputting the processed real-time data; performing processing for communication of the non real-time data and outputting the processed non real-time data; and receiving the processed real-time data and the processed non real-time data and preferentially selecting the real-time data.

Further, according to a sixth aspect of the present invention, there is provided a method of ATM communication including the steps of receiving real-time data for real-time communication; receiving non real-time data for non real-time communication; performing processing for communication of the real-time data and outputting the processed real-time data; performing processing for communication of the non real-time data and outputting the processed non real-time data; receiving the processed real-time data and the processed non real-time data and prefer-entially selecting the real-time data; performing processing for converting between first data in the ATM communication network and second data in the ATM communications device; separating the converted data into real-time data to be communicated in real time and a non real-time data not to be communicated in real time; performing processing for communication of the real-time data and outputting the processed real-time data; and performing processing for communication of the non real-time data and outputting the processed non real-time data.

BRIEF DESCRIPTION OF THE DRAWINGS

These and other objects and features of the present invention will become clearer from the following description of the preferred embodiments with reference to the accompanying drawings, in which:

FIGS. 7A and 7B are views illustrating an example of a detailed configuration focusing on an SAR block 34.

DESCRIPTION OF THE PREFERRED EMBODIMENTS

Below, preferred embodiments of an ATM communications device of the present invention will be explained with reference to the accompanying drawings.

Figure 3:
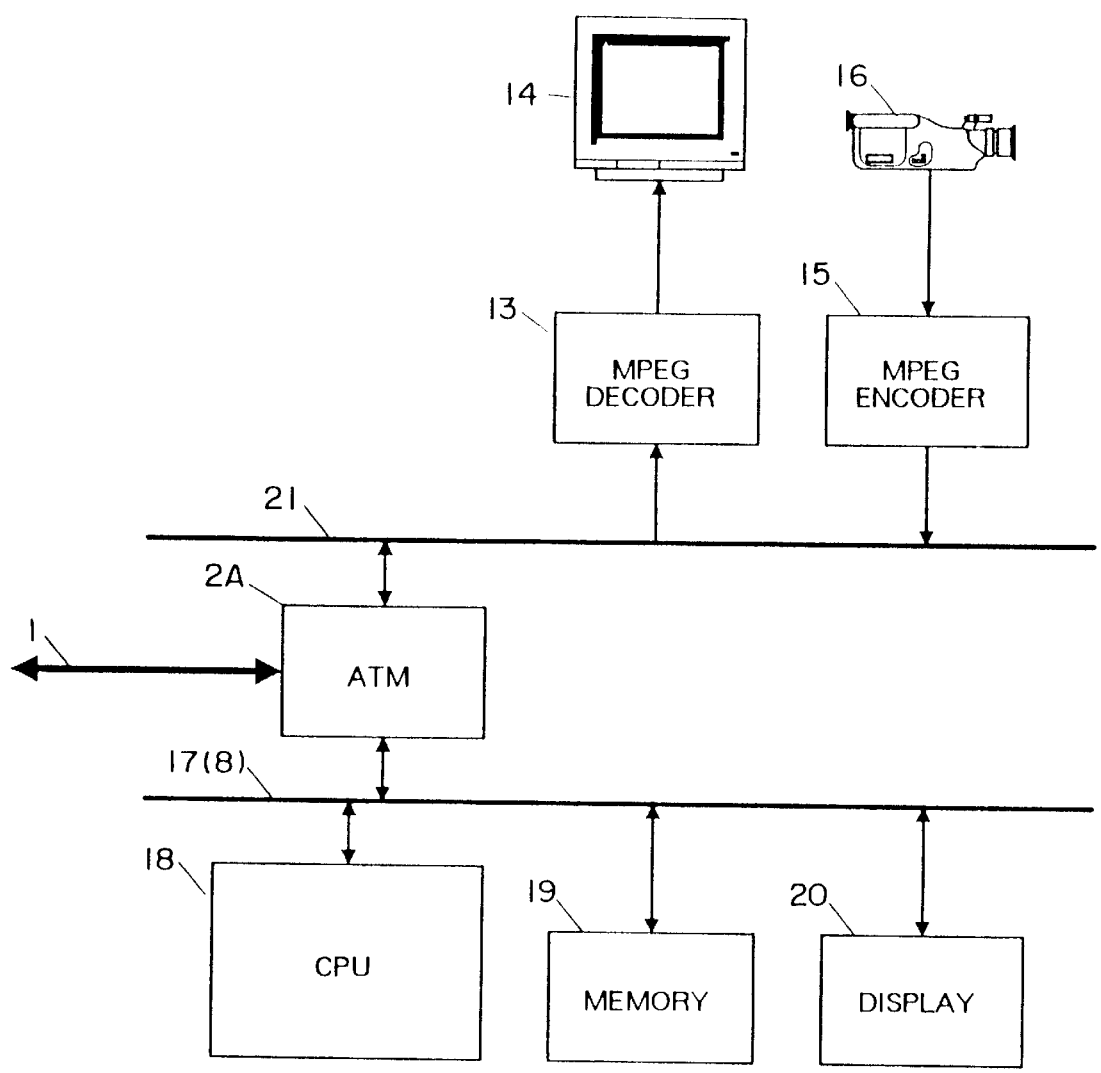
FIG. 3 is a block diagram of the configuration of an embodiment of a communications device using ATM according to the present invention.

FIG. 3 is a block diagram of the configuration of an embodiment of an ATM communications device according to the present invention.

Figure 4:
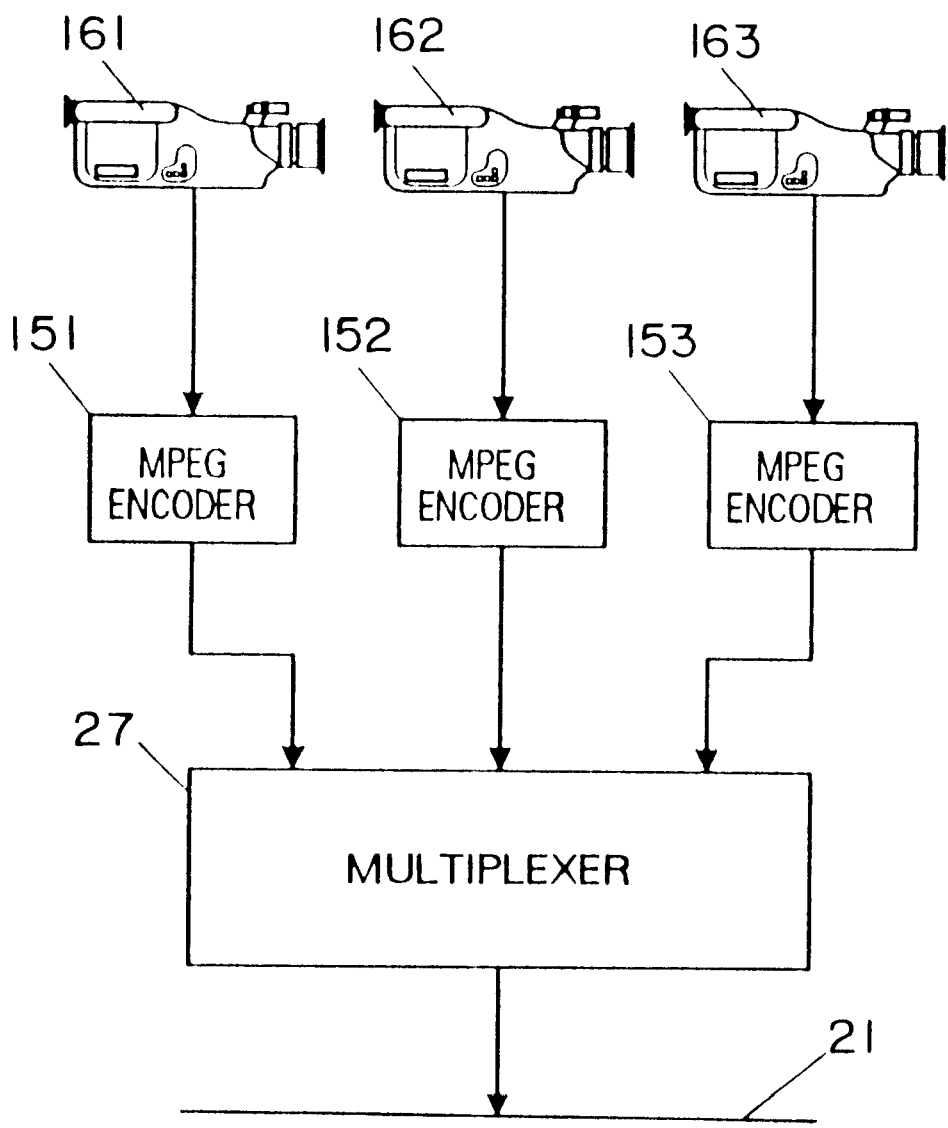
FIG. 4 is a block diagram of a multiplexer of the MPEG in FIG. 3.

With the ATM communications device (communication system) shown in FIGS. 3 and 4, it is possible to connect to a real-time signal bus 21 in addition to a local CPU bus 17 (or PCI bus 8).

Note that the CPU bus 17 is an ordinary computer bus connected to a CPU 18, and that the PCI bus 8 is a 32-bit local bus developed by Intel Corporation. The local bus of the present invention is not limited to the CPU bus 17 or to the PCI bus 8 and a variety of local buses can be used in addition to the PCI bus 8. However, an embodiment using the CPU bus 17 or the PCI bus 8 will be explained below.

In the present embodiment, a real-time signal bus 21 connects an MPEG decoder 13 and an MPEG encoder 15 and transmits a video signal, particularly a video signal compressed by MPEG2, etc. Thus, the real-time signal bus 21 requires real-time operation. It is preferably a bus which is suitable for video signal transmission.

The ATM communications device 2A is realized, for example, using an NIC in the same way as the above-mentioned ATM communications device 2, however, differs from the ATM communications device 2, which is connected only to the PCI bus 8 (or to the CPU bus 17), in that it is connected to both the PCI bus 8 and the real-time signal bus 21.

The PCI bus 8 is connected to a CPU 18, a memory 19, and a display 20.

The real-time signal bus 21 provided in the embodiment is connected to an MPEG decoder 13 and MPEG encoder 15. The MPEG decoder 13 is connected to a television monitor 14 which displays an image based on the video signal decoded by the MPEG decoder 13. The MPEG encoder 15 is connected to a video camera 16 and encodes a video signal from the video camera 16 to a video signal of the MPEG2.

As is clear from the configuration shown in FIG. 3, in the present embodiment, the real-time signal bus 21 is provided in addition to the PCI bus 8 (or the CPU bus 17) to increase local buses, so the ATM communications device 2A is configured to be connectable to the real-time signal bus 21 in addition to the PCI bus 8. Furthermore, the PCI bus 8 and real-time signal bus 21 are respectively connected to suitable ATM devices depending on the communication conditions.

Note that the above increase of the number of local buses may also be said to be separation of the local bus. In other words, it may be considered the separation of the PCI bus 8 shown in FIG. 3 into the PCI bus 8 and the real-time signal bus 21.

The separation of the local bus shown in FIG. 3 will be examined below.

In the ATM, a VC (virtual channel)/VP (virtual path) connection is set. When setting it, it is already known whether real time communication is required or not. Accordingly, by setting a specified connection to the real-time device bus, it is possible to separate a local bus effectively based on the VCI (virtual channel identifier)/VPI (virtual path identifier). In place of a VCI/VPI, a PVC (permanent virtual channel) identifier may also be used as a standard for separation. In that case, once an identifier is designed, it is will no longer to necessary to redesign it and the circuit can be simplified. Connection to the local buses in the ATM communications device shown in FIG. 3, that is the PCI bus 8 and the real-time signal bus 21, is determined depending on whether a real-time operation is required or not.

There are usually one or two real-time mode input/output devices per terminal in most applications. For example, it is usually sufficient to provide one MPEG decoder 13 and one MPEG encoder 15 per communications device. This is because even in applications which handle large amounts of input/output images, it is possible to combine the images into a single stream using MPEG multiplexing as shown in FIGS. 4 and 5.

Instead of one system of the MPEG encoder 15 and the video camera 16 shown in FIG. 3, FIG. 4 shows an example of three systems of the MPEG encoders 151 to 153 and video cameras 161 to 163. Information in the three systems of the MPEG encoders 151 to 153 is multiplexed by a multiplexer 27, whereby an equivalent configuration is obtained as when a single system of an MPEG encoder 15 is connected to the real-time signal bus 21.

Figure 5:
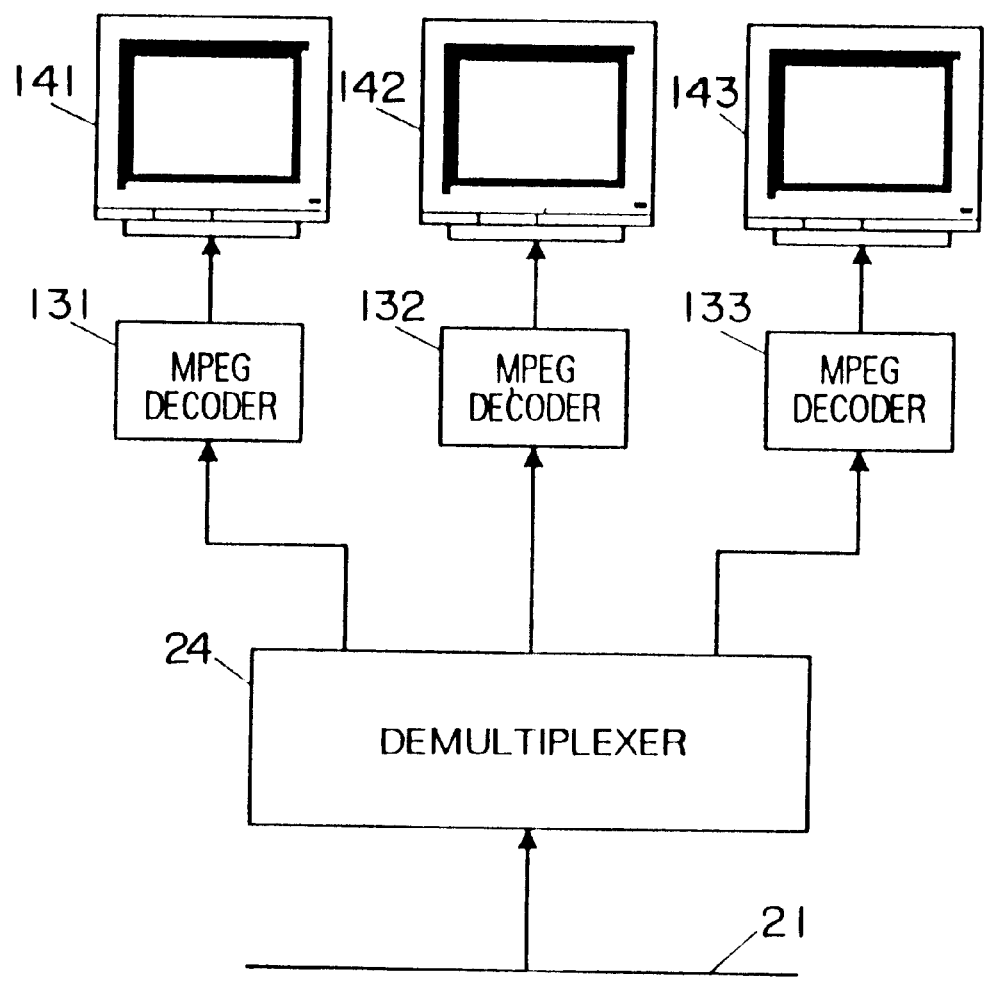
FIG. 5 is a block diagram of a demultiplexer of the MPEG.

In place of the single system of the MPEG decoder 13 and the TV monitor 14 shown in FIG. 3, FIG. 5 shows an example of three systems of MPEG decoders 131 to 133 and TV monitors 141 to 143. Information from the real-time bus 21 to the three systems of MPEG decoders 131 to 133 is demultiplexed using a demultiplexer 24, whereby an equivalent configuration is obtained as when a single system of an MPEG decoder 13 is connected to the real-time signal bus 21.

Normally, the amount of traffic of real-time data in the real-time signal bus 21 is considerably small comparing with the access to the main memory device (memory 19) connected to the PCI bus 8. For example, access to the memory 19 or to the display 20 connected to the PCI bus 8 requires transfer at speeds of hundreds of Mbps, while a compressed video signal of the MPEG2 is transferred at the MPEG decoder 13 or at the MPEG encoder 15 connected to the real-time signal bus 21 at speeds of only several Mbps. Therefore, even when a local bus (PCI bus 8) is divided into a PC bus 8 and real-time signal bus 21, for example, a bus with of one bit is sufficient. It is therefore possible for several devices to share a one-bit bus by time division.

Figure 1:
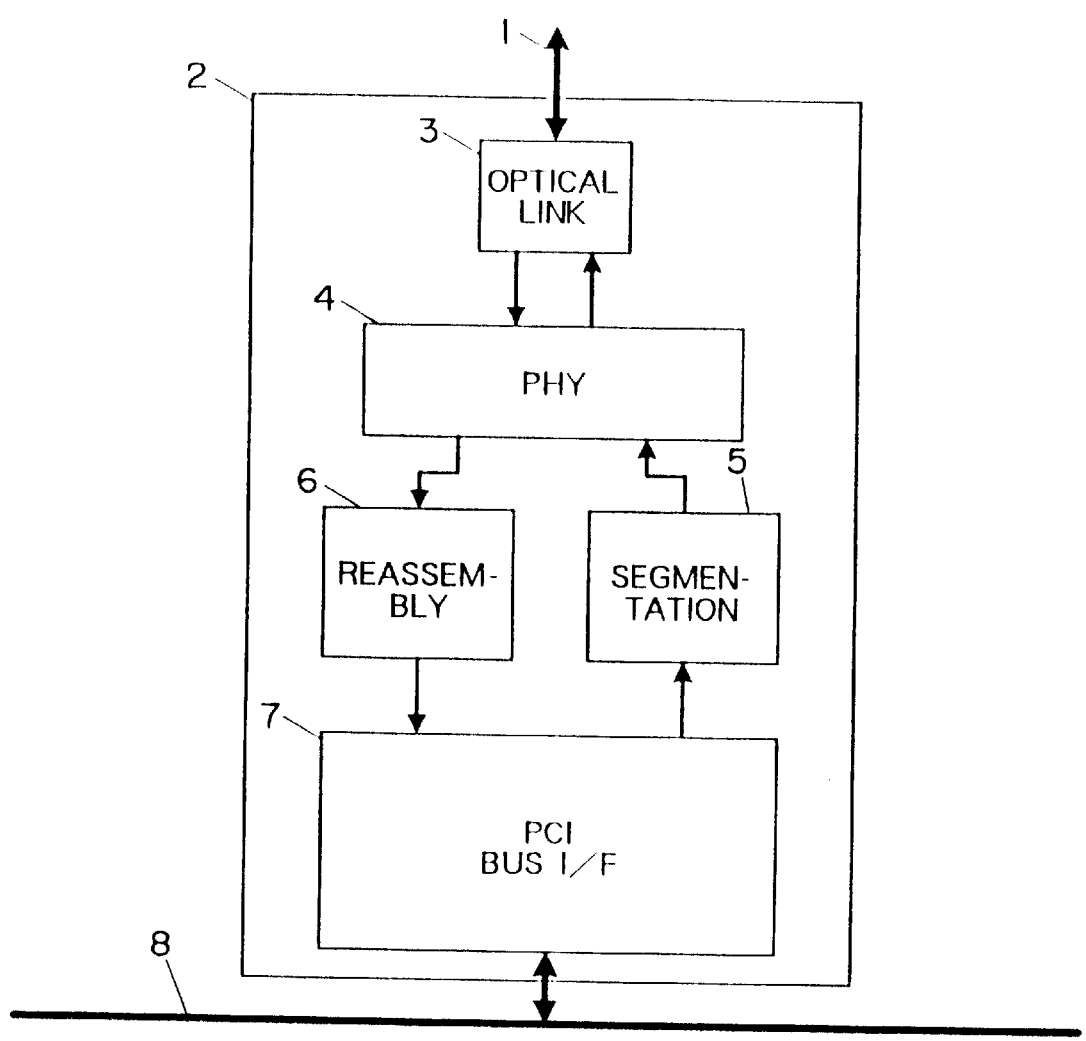
FIG. 1 is a block diagram of the configuration of a communications device (NIC) using ATM of the related art.
Figure 2:
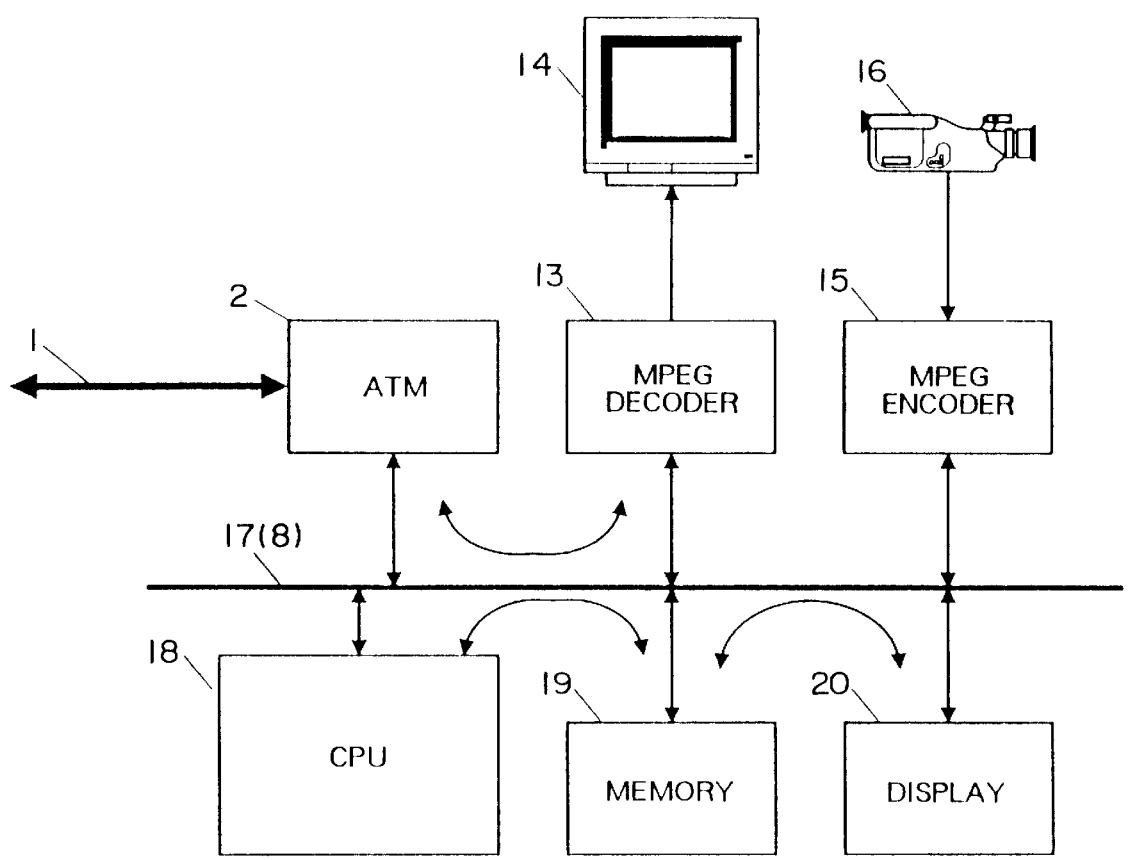
FIG. 2 is a block diagram of an ATM terminal of the related art.

Thus, according to the configuration shown in FIG. 4, the traffic congestion of the local bus (PCI bus 8 or the CPU bus 17) shown in FIG. 1 can be eliminated, and the real-time quality can be maintained, so the advantages of ATM communication can be efficiently utilized.

Examples of the above embodiment will be explained in more detail next referring to FIGS. 6 and 7A and 7B.

Figure 6:
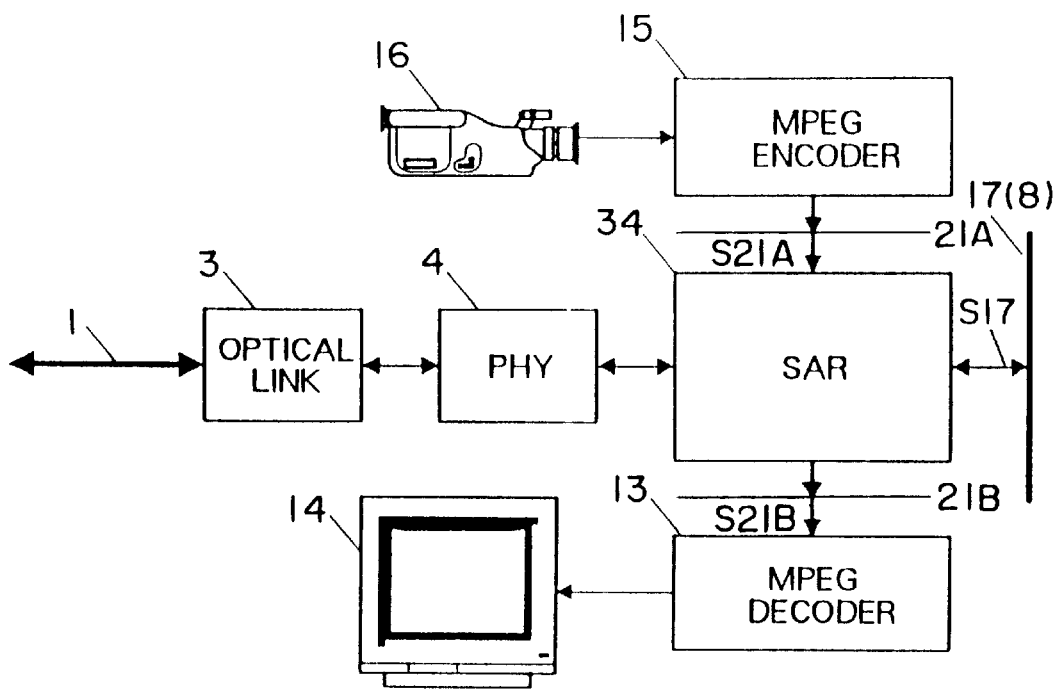
FIG. 6 is an overall block diagram explaining an embodiment according to the present invention.

FIG. 6 is a block diagram of the overall configuration of an ATM terminal.

The ATM device 2B shown in FIG. 6 comprises an optical link 3 connected to an optical fiber 1, a physical layer block 4, and a segmentation and reassembly (SAR) block 34. The optical link 3 here corresponds to the link shown in FIG. 1, while the physical layer device 4 corresponds to the device in FIG. 1.

The SAR block 34 corresponds to a combination of the segmentation device 5, reassembling device 6, and PCI device interface 7 and carries out data segmentation processing in the segmentation device 5, data reassembly processing in the reassembling device 6, and bus interface processing in the PCI bus interface 7. Accordingly, the SAR block 34 may also be referred to as a data segmentation and reassembly processing means.

The SAR block is connected to the CPU bus 17 or to the PCI bus 8 and connected to the first real-time signal bus 21A and the second real-time signal bus 21B.

The first real-time signal bus 21A is connected to the MPEG encoder 15 shown in FIG. 3. The MPEG encoder 15 is connected by the video camera 16. The second real-time signal bus 21B is connected to the MPEG decoder 13 shown in FIG. 3. The MPEG decoder 13 is connected to the TV monitor 14. That is, in this configuration, the real-time signal bus 21 shown in FIG. 3 is divided into the first real-time signal bus 21A and the second real-time signal bus 21B. In this example, the first real-time signal bus 21A is used as a real-time signal bus for receiving and the second real-time signal bus 21B is used as a real-time signal bus for transmission by the SAR block 34.

In the configuration shown in FIG. 6, while the real-time signal bus 21 was divided into the first real-time signal bus 21A and the second real-time signal bus 21B, as another embodiment of the present invention, a configuration with only the real-time signal bus 21 as shown in FIG. 3 is also possible.

The SAR block 34 separates the data into the data S17 to the CPU bus 17 (or the PCI bus 8), the data S21A of the first real-time signal bus 21A, and the data S21B of the second real-time signal bus 21B. These signals S17, S21A, and S21B are segmented into cell units and reassembled in the SAR block 34, then the signal of the cells is transmitted to the physical layer device 4. The physical layer device 4 performs signal processing depending on a specific physical layer, for example, transmits the signal to the optical link 3 for interfacing with the optical fiber as in the example of FIG. 6. The signal transmitted to the optical link 3 is transmitted via the optical fiber 1 to an ATM network, not shown.

The contents of the SAR block 34 will be explained in more detail below. FIGS. 7A and 7B are block diagrams of a detailed configuration centered on the SAR block 34.

The SAR block 34 is connected between the physical layer device 4 and the CPU device 17 (or the PCI bus 8). The SAR block 34 is also connected to the first real-time signal bus 21A and the second real-time signal bus 21B.

The CPU bus 17 is connected to the CPU 18 and the memory 19. Needless to say, the CPU bus 17 can be also connected to the display 20 as shown in FIG. 3.

The first real-time signal bus 21A is connected to the MPEG encoder 15, and the second real-time signal bus 21B is connected to the MPEG decoder 13.

The SAR block 34 comprises a receiving processing unit 34A having a dual-port RAM 111 for receiving signals from the first real-time signal bus 21A and from the CPU bus 17 and a transmission precessing unit 34B having dual-port RAM 127 for transmitting signals to the second real-time signal bus 21B and to the CPU bus 17. Note, when looking at the physical layer device 4 from the SAR block 34 side, the receiving processing unit 34A functions as a transmission unit to the physical layer device 4, and the transmission processing unit 34B functions as a receiving unit from the physical layer device 4. Accordingly, seen from the first and second real-time signal buses 21A and 21B and CPU bus 17 side, the receiving processing unit 34A and the transmission processing unit 34B can be referred to with the reverse names. Below, a portion receiving data from a local bus will be referred to as a receiving unit, and a portion transmitting data to a local bus will be referred to as a transmission unit.

The receiving processing unit 34 comprises an input interface 103 connected to the first real-time signal bus 21A, an FIFO 104, a cell generating block 105, a header adding block 106, and a traffic shaper 107. The receiving processing unit 34A further comprises a dual-port memory 111 connected to the CPU bus 17, a cell generating block 112, a header adding block 113, and a traffic shaper 114. The traffic shapers 107 and 114 are connected to a bus arbiter 115, and the bus arbiter 115 is connected to the physical layer device 4.

The transmission processing unit 34B comprises a VC filter 118 connected to the physical layer device 4, a CRC check block 125, a packet generating block 126, and a dual-port memory 127. The dual-port memory 127 is connected to the CPU bus 17. The transmission processing unit 34B further comprises a CRC check block 119 connected to the VC filter 118, a packet generating block 120, an FIFO 121, and an output interface 122. The output interface 122 is connected to the second real-time signal bus 21B.

The physical layer device 4 is, as shown in FIG. 6, connected via the optical link 3 and the optical fiber 1 to an ATM network.

In the SAR block 34 shown in FIGS. 7A and 7B, the receiving processing unit 34A comprises a real-time signal receiving system consisting of an input interface 103 to a traffic shaper 107 for carrying out processing for transmitting a real-time signal to the first real-time signal bus 21A and a non real-time receiving system consisting of a dual-port memory 111 to a traffic shaper 114 for carrying out processing for transmitting a non real-time signal to the CPU bus 17. The bus arbiter 115 coordinates between the real-time signal and non real-time signal for the physical layer device 4. In the present embodiment, the real-time signal always given priority in output to the physical layer device 4.

The transmission processing unit 34B comprises a real-time transmission system consisting of the CRC check block 119 to the output interface 122 for carrying out the processing of the second real-time signal bus 21B to transmit a real-time signal and a non real-time transmission system consisting of the CRC check block 125 to the dual-port memory 127 for carrying out the processing of the CPU bus 17 to transmit the non real-time signal. The VC filter 118 separates the signal from the physical layer device 4 into a real time signal and a non real-time signal.

Below, an explanation will be made of the SAR block 34.

The receiving processing unit 34A operates as follows.

Figure 8A:
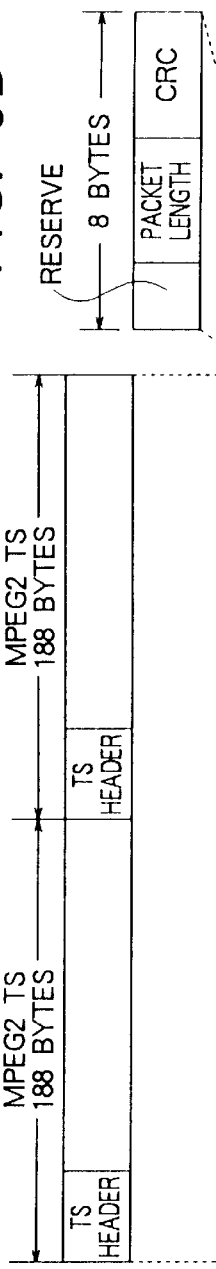
FIGS. 8A to 8E are configuration diagrams of data for explaining the relation between a transport stream and an ATM cell.
Figure 8B:
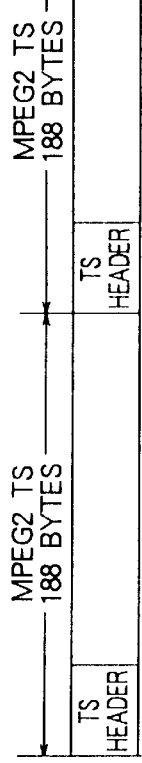
Figure 8C:
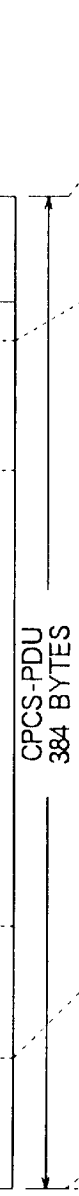
Figure 8D:
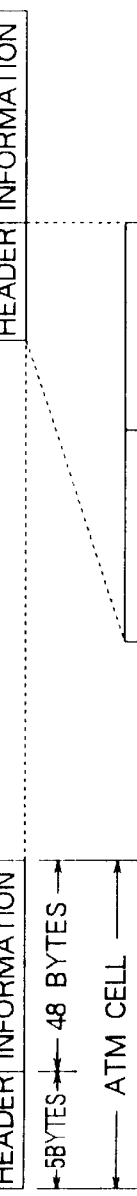

First, the processing for receiving real-time data will be explained. An NTSC signal of the video camera 16 is input to the MPEG encoder 15 as real-time data. Since a 188-byte MPEG2 transport stream (TS) is generally used in ATM communication, an example using TS shown in FIG. 8A will be described here. The transport stream (TS) is input to an input interface 103 in the order produced. The input interface 103 identifies a TS header at the top of the transport stream (TS) and writes the transport stream in the FIFO 104. The transport stream (TS) stored in the FIFO 104 is output to a cell generating block 105 in order. After receiving two TS's, the cell generating block 105 adds to the remaining trailers a CRC-32 (circular redundant code) to guarantee frame correctness and segments the stream into eight cells of 48 bytes as shown in FIG. 8C. The header adding block 106 adds a 5-byte header to the 48-byte cells, as shown in FIG. 8D, to produce 53-byte ATM cells. The ATM cells are suitably spaced apart by predetermined intervals set in the traffic shaper 107.

Figure 8E:
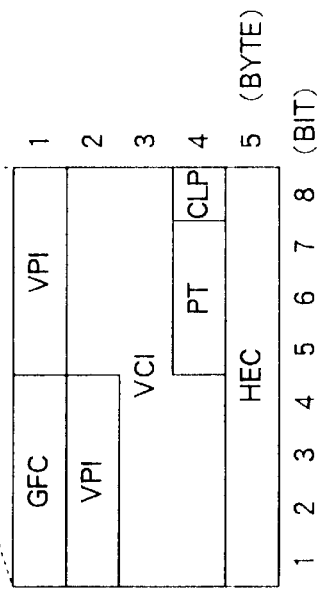

In the header of an ATM cell shown in FIG. 8E, GFC means "generic flow control". This is used for preventing collision of ATM cells transmitted from different terminal devices and enabling equal use by the terminals of a transmission path.

VPI means a "virtual path identifier" and is an identifier for deciding which virtual path to use.

VCI means a "virtual channel identifier" and is an identifier for deciding which virtual channel multiplexed on a virtual path to use for transmitting data to a receiver.

PT means "payload type" and indicates the type of information (user information cell, maintenance and operation cell, or resource management cell) in the 48-byte user information (payload portion) in the ATM cell.

CLP means "cell loss priority" and is used for controlling traffic when the traffic overflows in the network by discarding less significant cells in order to transmit more significant cells as much as possible.

HEC means "header error control" and is a 1-byte cyclic redundancy check portion for checking errors in the previous 4-byte header information.

Next, an explanation will be given of processing for receiving non real-time data. The non real-time data is transmitted by the CPU 18 from the memory 19 via the CPU bus 17 to the dual-port memory 111. The non real-time data transmitted to the dual-port memory 111 is converted to cells in the cell generating block 112 based on the predetermined PDU (packet data unit) size in the same way as the processing of the cell generating block 105 to the traffic shaper 107, a header is added in the header adding block 113, then a traffic shaping operation is carried out on the cells in the traffic shaper 114.

The output from the traffic shaper 107 and the output from the traffic shaper 114 are organized by buffering the same timing cells in the bus arbiter 115 and are output to the physical layer device 4. At this time, a maximum cell rate can be set according to the network limitations.

The operation of the transmission processing unit 34B will be explained next.

The VC filter 118 separates the ATM cells output from the physical layer device 4 into real-time data and non real-time data based on the VPI/VCI or PVC. In the case of using PVC, the CPU 18 sets the PVC in the memory of the VC filter 118 based on the connection information. The data from the CPU bus 117 is input sequentially to the buffer 118A and compared by the comparator 118B to determine whether it is same as the PVC set in the memory 118C. When it is identical, it is output to the CRC check block 119, while when not identical, it is output to the CRC check block 125.

The CRC of the non real-time data is checked for each PVC in the CRC check block 125. When an error is found, the data is discarded as necessary. When the data is correct, it is reassembled to a PDU unit in the packet generating block 126 and is written in the dual-port memory 127. The arrival of a PDU unit of the non real-time data is notified to the CPU 18 by an interruption signal. The CPU 18 then sends it to the memory 19 by a DMA (direct memory access) method etc.

The CRC of the real-time data is also checked for each PVC in the CRC check block 119. When an error is found, the data is discarded as necessary. When the data is correct, it is reassembled into a PDU unit in the packet generating block 120, then written in the FIFO 121 and output via the output interface 122 to the MPEG decoder 13. When it is a transport stream (TS), the output interface 122 outputs it to the MPEG decoder 13 after receiving 188 bytes. The video signal output to the MPEG decoder 13 is, for example, encoded as a NTSC signal for reproduction at the TV monitor 14.

Note that, in the above embodiment, though the second real-time signal bus 21B for transmitting real-time data and the first real-time signal bus 21A for receiving real-time data are shown separately, they can be replaced by single real-time signal bus 21 which is used in common.

Also, the present invention is not limited to the above device. It can be applied to several real-time devices connected to a real-time bus.

According to the present invention, the congestion of local bus traffic can be eliminated, the real-time quality can be maintained, and thus the advantages of ATM communication can be fully realized by ATM terminals for real-time data and for non real-time data.

Also, according to the present invention, the load on the CPU and bus can be reduced.

Furthermore, according to the present invention, the number of device required for a real-time system is small, usually one or two, the rate is also low, and only a small number of signal lines need be added. Therefore the overall configuration can be kept small in scale.

Note that the present invention is not limited to the above embodiments and includes modifications within the scope of the claims.

What is claimed is:

1. An ATM communications device comprising:
   a first real-time signal bus for receiving data and a second real-time signal bus for outputting data and which is separate from said first real-time signal bus;
   a separating means for separating a ATM cell into real-time data to be communicated in real time and non real-time data not to be communicated in real time;
   a real-time data processing means adapted to be coupled to said second real-time signal bus for performing processing for communication of the real-time data and outputting the processed real-time data to said second real-time signal bus; and
   a non real-time data processing means adapted to be coupled to a local bus for performing the processing for communication of the non real-time data and outputting the processed non real-time data to said local bus,
   wherein said first real-time signal bus and said second real-time signal bus are each separate from said local bus.

2. An ATM communications device according to claim 1, wherein
   the real-time data comprises a first identifier,
   the non real-time data comprises a second identifier, and
   the separating means separates the real-time data and the non real-time data by identifying the first identifier and/or the second identifier.

3. An ATM communications device according to claim 2, wherein the first and second identifiers are permanent virtual channel type identifiers.

4. An ATM communications device according to claim 2, wherein the first and/or second identifiers are virtual path type identifiers and/or virtual channel type identifiers.

5. An ATM communications device comprising:
   a real-time bus means having a first real-time bus and a second real-time bus for input and output of real-time data for real time communication;
   a non real-time bus means having a local bus for input and output of non real-time data for non real-time communications;
   a first real-time data processing means for performing processing for communication of the real-time data and outputting the processed real-time data;
   a first non real-time data processing means for performing processing for communication of the non real-time data and outputting the processed non real-time data;
   a selecting means for receiving the processed real-time data and the processed non real-time data and preferentially selecting the input real-time data;
   a separating means for separating a ATM cell into real-time data to be communicated in real time and non real-time data not to be communicated in real time;
   a second real-time data processing means for performing processing for communication of the real-time data and outputting the processed real-time data to the real-time bus means; and
   a second non real-time data processing means for performing processing for communication of the non real-time data and outputting the processed non real-time data to said local bus,
   wherein the first real-time bus and the second real-time bus are each separate from said local bus.

6. An ATM communications device according to claim 5, wherein the first real-time bus receives the real-time data, and the second real-time bus outputs the real-time data.

7. A method of ATM communication including the steps of:
   separating a ATM cell into real-time data to be communicated in real time and non real-time data not to be communicated in real time;

performing processing by use of a real-time data processing device adapted to be coupled to a real-time signal bus means for communication of the real-time data and outputting the processed real-time data to said real-time signal bus means; and performing processing by use of a non real-time data processing device adapted to be coupled to a local bus for communication of the non real-time data and outputting the processed non real-time data to said local bus, whereby said real-time bus means includes a first real-time signal bus and a second real-time signal bus which is separate from said first real-time signal bus and wherein said first real-time signal bus and said second real-time signal bus are each separate from said local bus.

8. A method of ATM communication including the steps of:

receiving real-time data for real-time communication by use of real-time bus means having a first real-time bus and a second real-time bus;

receiving non real-time data for non real-time communication by use of non real-time bus means having a local bus;

performing processing for communication of the real-time data and outputting the processed real-time data;

performing processing for communication of the non real-time data and outputting the processed non real-time data;

receiving the processed real-time data and the processed non real-time data and preferentially selecting the real-time data;

separating a ATM cell into real-time data to be communicated in real time and a non real-time data not to be communicated in real time;

performing processing for communication of the real-time data and outputting the processed real-time data to a real-time bus; and performing processing for communication of the non real-time data and outputting the processed non real-time data to said local bus, wherein said first real-time signal bus and the second real-time bus are each separate from said local bus.

* * * * *